(12) United States Patent
Liao et al.

(10) Patent No.: US 7,377,680 B2
(45) Date of Patent: May 27, 2008

(54) LIGHT SPREADING DEVICE AND BACKLIGHT MODULE UTILIZING THE SAME

(75) Inventors: Jing-Huan Liao, Taoyuan (TW);
Mei-Fen Lin, Banciao (TW);
Pang-Hsuan Liu, Taoyuan County (TW); Chih-Lin Wang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 73 days.

(21) Appl. No.: 11/419,513

(22) Filed: May 22, 2006

(65) Prior Publication Data

US 2006/0198160 A1    Sep. 7, 2006

(30) Foreign Application Priority Data

Jan. 19, 2006  (TW)  ............................. 95102042 A

(51) Int. Cl.
*F21V 7/04* (2006.01)

(52) U.S. Cl. ...................... 362/610; 362/613; 362/628; 362/333; 362/339; 385/129; 385/146; 385/901

(58) Field of Classification Search ................ 362/333, 362/339, 608–610, 613, 628; 385/129, 146, 385/901
See application file for complete search history.

(56) References Cited

U.S. PATENT DOCUMENTS

| 3,740,540 | A  | * | 6/1973 | Takeichi et al. ............ 362/339 |
| 6,679,621 | B2 |   | 1/2004 | West et al. |
| 2006/0109684 | A1 | * | 5/2006 | Nesterenko et al. ........ 362/610 |

FOREIGN PATENT DOCUMENTS

| CN | 1670585 | 9/2005 |
| CN | 1687831 | 10/2005 |

OTHER PUBLICATIONS

CN Office Action mailed May 8, 2007.

* cited by examiner

*Primary Examiner*—Stephen F. Husar
(74) *Attorney, Agent, or Firm*—Thomas, Kayden, Horstemeyer & Risley

(57) ABSTRACT

A light spreading device and a backlight module utilizing the same. The backlight module includes a light guide, a plurality of point lights, and a plurality of light spreading devices. The light guide includes an entrance surface. The point lights are disposed near the entrance surface. Each light spreading device, corresponding to one of the point lights, is disposed between the light guide and the corresponding point light.

17 Claims, 3 Drawing Sheets

30a

30b

30c

LIGHT SPREADING DEVICE AND BACKLIGHT MODULE UTILIZING THE SAME

BACKGROUND OF THE INVENTION

1. Field of the Invention

The present invention relates to a light spreading device and a backlight module utilizing the same, and in particular, to a backlight module with improved illumination uniformity.

2. Description of the Related Art

When point lights, such as light emitting diodes (LED), are combined with a light guide in a conventional backlight module, the directivities of the point lights usually causes a non-uniformity of brightness due to improperly mixed light of adjacent point lights. In particular, when the point lights are combined with a V-cut light guide, shadows are easily generated, thus deteriorating illumination uniformity.

BRIEF SUMMARY OF THE INVENTION

Backlight modules are provided. An exemplary embodiment of a backlight module comprises a light guide, a plurality of point lights, and a plurality of light spreading devices. The light guide comprises a first entrance surface. The point lights are disposed near the first entrance surface. Each light spreading device, corresponding to one of the point lights, is disposed between the light guide and the corresponding point light.

Furthermore, each light spreading device comprises two spreading portions which are mutually symmetrical with respect to a direction perpendicular to the first entrance surface. Each spreading portion comprises an exit surface facing the first entrance surface, and a second entrance surface facing the corresponding point light. An acute angle intersected by the exit surface and the first entrance surface is less than thirty five degrees. An acute angle intersected by the second entrance surface and a line parallel with the first entrance surface is greater than seventy degrees.

Alternatively, each light spreading device comprises two spreading portions which are substantially triangular and mutually symmetrical with respect to a direction perpendicular to the first entrance surface, and the triangular spreading portions are connected with each other in an angle-to-angle manner. Each spreading portion comprises an exit surface facing the first entrance surface, and an acute angle intersected by the exit surface and the first entrance surface is less than thirty five degrees. Each spreading portion comprises a second entrance surface facing the corresponding point light, and an acute angle intersected by the second entrance surface and a line parallel with the first entrance surface is greater than seventy degrees.

Note that each light spreading device may comprise silicon, polycarbonate, or resin, and may be made by die casting or injection molding. Each point light is a light emitting diode.

Moreover, each light spreading device may be disposed on the corresponding point light or adhered to the first entrance surface. Alternatively, the first entrance surface comprises a plurality of concave portions in which the light spreading devices are disposed independently.

Light spreading devices are provided. An exemplary embodiment of a light spreading device comprises two spreading portions which are mutually symmetrical with respect to a central line. Each spreading portion comprises an exit surface and an entrance surface. An acute angle intersected by the exit surface and a line perpendicular to the central line is less than thirty five degrees. An acute angle intersected by the entrance surface and a line perpendicular to the central line is greater than seventy degrees.

Another exemplary embodiment of a light spreading device comprises two spreading portions which are substantially triangular and mutually symmetrical with respect to a central line. The triangular spreading portions are connected with each other in an angle-to-angle manner.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
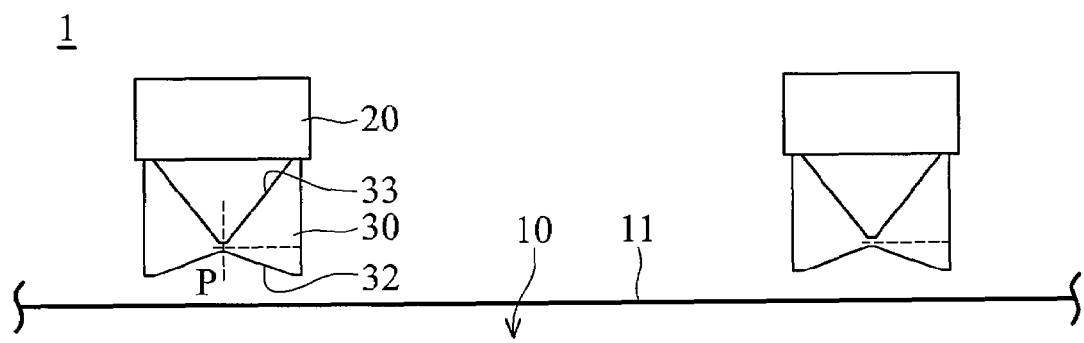
FIG. 1 is a schematic view of an embodiment of a backlight module of the invention.

Referring to FIG. 1, an embodiment of a backlight module 1 according to the invention comprises a light guide 10, a plurality of point lights 20, and a plurality of light spreading devices 30. Although there are only two point lights 20 and two light spreading devices 30 in FIG. 1, the number of the point lights and the light spreading devices can be adjusted based on requirements. Furthermore, the backlight module 1 may comprise other components such as optical films; however, since other components are similar with those of the conventional backlight module and are less relevant to the embodiment of the invention, their detailed description is omitted.

The light guide 10 comprises a first entrance surface 11. Each point light 20 is disposed near the first entrance surface 11 so that light emitted from the point light 20 can enter the light guide 10 via the first entrance surface 11. Furthermore, each point light 20 may preferably be a light emitting diode, and may be Batwing type or Lambertian type, or may be purchased from Lumileds.

Figure 2:
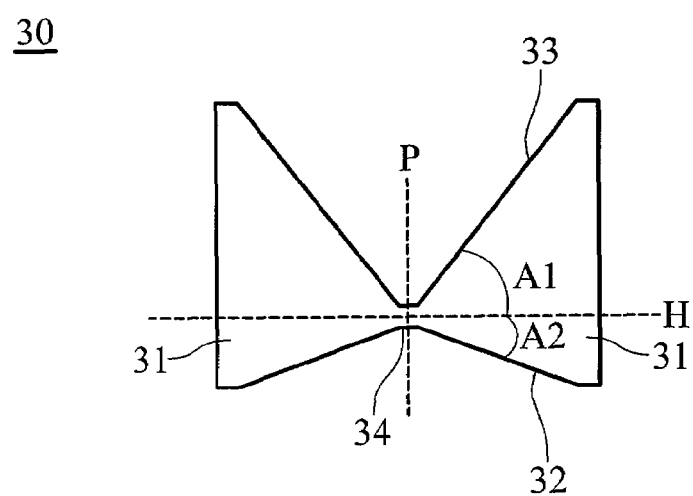
FIG. 2 is a schematic view of a light spreading device in FIG. 1.

Each light spreading device 30 corresponds to one of the point lights 20, and is disposed on the corresponding point light 20 and located between the light guide 10 and the corresponding point light 20. Referring to FIG. 2, each light spreading device 30 comprises two spreading portions 31 which are mutually symmetrical with respect to a central line P. Each spreading portion 31 comprises an exit surface 32 facing the first entrance surface 11 of the light guide 10, and a second entrance surface 33 facing the corresponding point light 20. An acute angle intersected by the exit surface 32 and a divided line H (that is, a line perpendicular to the central line P) is less than thirty-five degrees. An acute angle intersected by the second entrance surface 33 and the divided line H is greater than seventy degrees.

Note that the central line P is located in a direction perpendicular to the first entrance surface 11 of the light guide 10. That is, the spreading portions 31 are mutually symmetrical with respect to the direction perpendicular to the first entrance surface 11 of the light guide 10. Furthermore, the divided line H is parallel with the first entrance surface 11 of the light guide 10. That is, an acute angle intersected by the exit surface 32 of the spreading portion 31 and the first entrance surface 11 of the light guide 10 is also less than thirty-five degrees. Additionally, the divided line H is a line parallel with the first entrance surface 11 of the light guide 10. That is, an acute angle intersected by the second entrance surface 33 of the spreading portion 31 and a line parallel with the first entrance surface 11 of the light guide 10 is greater than seventy degrees.

Figure 3A:
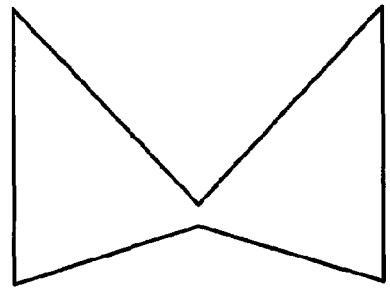
FIG. 3a is a schematic view of a variant embodiment of a light spreading device.
Figure 3B:
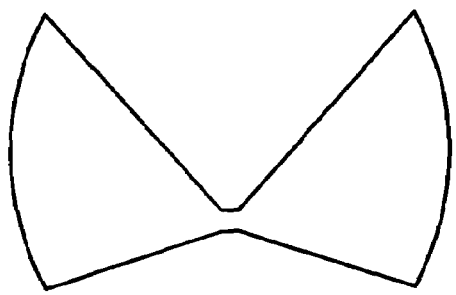
FIG. 3b is a schematic view of another variant embodiment of a light spreading device.
Figure 3C:
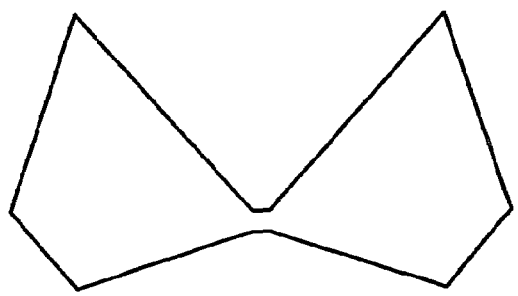
FIG. 3c is a schematic view of another variant embodiment of a light spreading device.

Furthermore, the spreading portions 31 of the light spreading device 30 are substantially triangular and are connected with each other in an angle-to-angle manner, and a connection portion 34 is located between the triangular spreading portions 31 in FIG. 2; however, they are not limited to this as long as the included angles of the spreading portion meet the above requirements. For example, as shown in a light spreading device 30a of FIG. 3a, two spreading portions are directly connected without a connection portion therebetween. Alternatively, as shown in a light spreading device 30b of FIG. 3b, each spreading portion comprises an arc surface respectively. Alternatively, as shown in a light spreading device 30c of FIG. 3c, each spreading portion is substantially a quadrangle. Additionally, both the exit surface 32 and the second entrance surface 33 of the light spreading device 30 are flat surfaces in the figures; however, they are not limited to this, and may be rough surfaces as long as the included angles of the spreading portion meet the above requirements.

Note that each light spreading device may comprise silicon, polycarbonate, or resin, and may be made by die casting or injection molding.

Figure 4A:
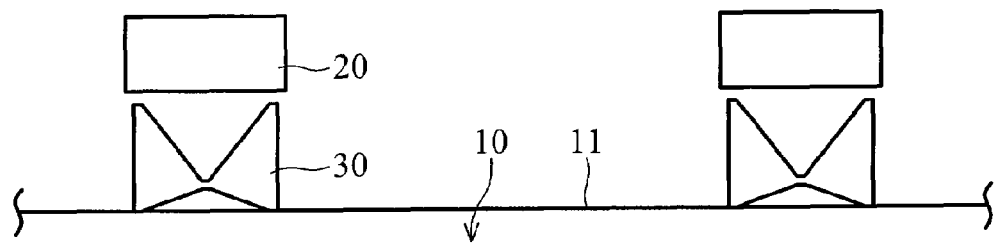
FIG. 4a is a schematic view of another embodiment of a backlight module of the invention.
Figure 4B:
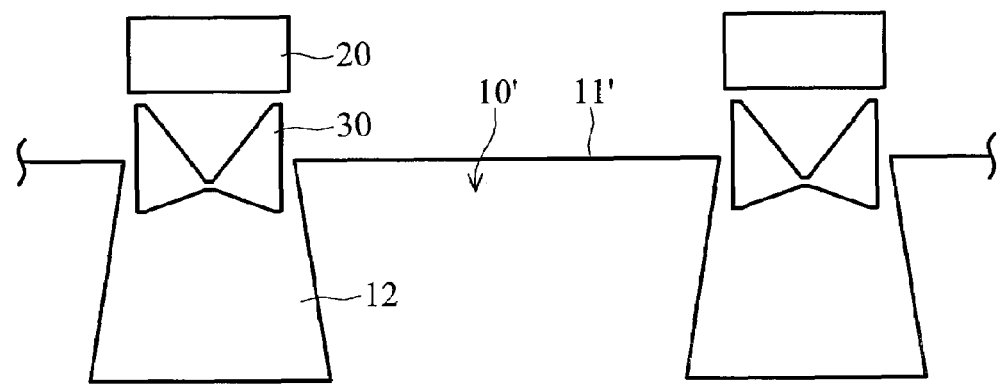
FIG. 4b is a schematic view of another embodiment of a backlight module of the invention.

Additionally, each light spreading device 30 is disposed on the corresponding point light 20 in FIG. 2; however, it is not limited this. For example, as shown in a backlight module 1a of FIG. 4a, each light spreading device 30 is adhered to the first entrance surface 11 of the light guide 10. Alternatively, as shown in a backlight module 1b of FIG. 4b, a first entrance surface 11' of a light guide 10' comprises a plurality of concave portions 12 in which the light spreading devices 30 are disposed independently.

The result of optical simulation shows that the shadows in the backlight module can be removed by the embodiments of the light spreading devices. Thus, illumination uniformity can be enhanced.

As previously described, since the directivities of the point lights can be changed by the embodiments of the light spreading devices before they enter the light guide, the light can be effectively mixed after entering the light guide. Thus, non-uniformity of brightness can be decreased.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module comprising:
   a light guide having a first entrance surface;
   a plurality of point lights disposed adjacent to the first entrance surface; and
   at least one light spreading device disposed between the light guide and one of the point lights;
   wherein the light spreading device comprises two spreading portions which are substantially triangular and mutually symmetrical with respect to a direction perpendicular to the first entrance surface of the light guide, and the triangular spreading portions are connected with each other in an angle-to-angle manner;
   wherein each spreading portion has a second entrance surface facing the corresponding point light, and an acute angle intersected by the second entrance surface and a line parallel with the first entrance surface of the light guide is greater than about 70 degrees.

2. The backlight module as claimed in claim 1, wherein the at least one light spreading device comprises two spreading portions which are mutually symmetrical with respect to a direction perpendicular to the first entrance surface of the light guide, each spreading portion comprises an exit surface facing the first entrance surface of the light guide, and a second entrance surface facing the corresponding point light, an acute angle intersected by the exit surface and the first entrance surface of the light guide is less than about 35 degrees, and an acute angle intersected by the second entrance surface and a line parallel with the first entrance surface of the light guide is greater than about 70 degrees.

3. The backlight module as claimed in claim 1, wherein each spreading portion has an exit surface facing the first entrance surface of the light guide, and an acute angle intersected by the exit surface and the first entrance surface of the light guide is less than about 35 degrees.

4. The backlight module as claimed in claim 3, wherein each spreading portion comprises a second entrance surface facing the corresponding point light, and an acute angle intersected by the second entrance surface and a line parallel with the first entrance surface of the light guide is greater than about 70 degrees.

5. The backlight module as claimed in claim 1, wherein the light spreading device comprises silicon, polycarbonate, or resin.

6. The backlight module as claimed in claim 1, wherein the light spreading device is made by die casting or injection molding.

7. The backlight module as claimed in claim 1, wherein the light spreading device is disposed on the corresponding point light.

8. The backlight module as claimed in claim 1, wherein the light spreading device is adhered to the first entrance surface of the light guide.

9. The backlight module as claimed in claim 1, wherein the first entrance surface comprises at least one concave portion in which the light spreading device is disposed.

10. The backlight module as claimed in claim 1, wherein at least one of the plurality of point lights comprises a light emitting diode.

11. A light spreading device comprising two spreading portions which are mutually symmetrical with respect to a central line, wherein each spreading portion has an exit surface and an entrance surface, an acute angle intersected by the exit surface and a line perpendicular to the central line is less than 35 degrees, and an acute angle intersected by the entrance surface and a line perpendicular to the central line is greater than 70 degrees.

12. The light spreading device as claimed in claim 11, wherein the light spreading device comprises silicon, polycarbonate, or resin.

13. The light spreading device as claimed in claim 11, wherein the light spreading device is made by die casting or injection molding.

14. A light spreading device comprising two spreading portions which are substantially triangular and mutually symmetrical with respect to a central line, wherein the triangular spreading portions are connected with each other in an angle-to-angle manner, each spreading portion has an entrance surface, and an acute angle intersected by the entrance surface and a line perpendicular to the central line is greater than about 70 degrees.

15. The light spreading device as claimed in claim 14, wherein each spreading portion has an exit surface, and an acute angle intersected by the exit surface and a line perpendicular to the central line is less than about 35 degrees.

16. The light spreading device as claimed in claim 14, wherein the light spreading device comprises silicon, polycarbonate, or resin.

17. The light spreading device as claimed in claim 14, wherein the light spreading device is made by die casting or injection molding.

* * * * *